ial No. 412,825
5 Claims. (Cl. 161—199)

This application is a continuation-in-part of our copending application Serial No. 408,374, filed November 2, 1964.

This invention relates to improved laminated safety-glass. More particularly, this invention relates to laminated safety-glass having an interlayer of a plasticized polyvinyl acetal, which has higher resistance to penetration.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of skull fracture which may occur when a head strikes the windshield, while also supplying added resistance to penetration.

The interlayers in present day commercial windshields usually contain about 0.3 to 0.5% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in a laminated safety-glass by bonding two glass panels with an interlayer of a plasticized polyvinyl acetal resin; said interlayer having a moisture content of 0.1 to 0.8% by weight and containing sufficient potassium formate to produce an alkalinity titer of above 25.

The alkalinity titer is the number of milliliters of 0.01 normal hydrochloric acid required to neutralize 100 grams of the polyvinyl acetal resin. This is an arbitrary standard used to designate the alkalinity of the resin. The alkalinity titer is usually determined prior to plasticization by dissolving 7 grams of the polyvinyl acetal resin in 250 cc. of preneutralized ethyl alcohol and titrating with 0.005 normal hydrochloric acid to the endpoint using brom-phenol blue indicator and calculating from the result obtained to determine the milliliters of 0.01 normal acid required for 100 grams resin.

Heretofore, it has been customary to stabilize polyvinyl acetals for interlayers with potassium or sodium hydroxide and/or potassium or sodium acetate by adding small amounts of these materials. These are normally added during the preparation of the polyvinyl acetal. Large amounts of these salts or bases tend to increase the color of the extruded plasticized resin which is undesirable in an interlayer. The presence of such alkaline materials produces the alkalinity titer in conventional polyvinyl acetal interlayers.

The following examples are given in illustration of the invention and are not intended as limitations thereof. All parts and percentages are by weight unless otherwise specified.

EXAMPLE I (a) This example uses a conventional polyvinyl acetal interlayer for safety-glass. It is a polyvinyl butyral containing 18.8% vinyl alcohol by weight and having an alkalinity titer of 20. This titer is due to the presence of potassium acetate in the polyvinyl butyral. The resin is plasticized with 44 parts triethylene glycol di(2-ethyl butyrate) and has a moisture content of about 0.4%. The interlayer is formed into a sheet 0.015 inch thick (15 gauge). These interlayer sheets are used as controls.

A set of ten glass laminates are individually prepared by interposing the interlayer between two 24 x 36 x 0.125 inch panels of glass. The resulting laminates are then subjected to a temperature of about 275° F. at a pressure of 185 p.s.i. for approximately 10 minutes to bond the laminate or panels together.

Further sets of glass laminates were similarly prepared as above using plasticized polyvinyl butyral containing potassium acetate at varying levels producing the following alkalinity titers:

(b) 29
(c) 42
(d) 56
(e) 87

The laminates prepared by the above procedure are then subjected to "mean break height" tests according to the recently established tentative specification set up by the Society of Automotive Engineers, the Subcommittee on Automotive Glazing and the results tabulated in Table I.

In essence, the "mean break height" test comprises placing the laminate in a horizontal position with a frame or edge support and while maintaining a laminate temperature of 70° F., allowing a 22 pound spherical ball (referred to as a head form) to drop from a designated height against approximately the middle of the laminate. This test is repeated at increasing ball-drop heights to determine the approximate height in feet at which 50% of the laminates tested will resist penetration. In other words, the "mean break height" of a laminate is a measure of the ability of that laminate to absorb the energy of an impacting object.

A standard test was used to determine the color of the resin used. This color is expressed as "percent yellow." A 7½% solution of polyvinyl butyral resin is prepared by dissolving in methanol. This test is generally conducted on the plasticized resin and so for a resin containing 44 parts plasticizer per 100 parts resin the 7½% solution is obtained by dissolving 5.4 parts plasticized resin in 44.6 parts methanol.

Absorption readings are obtained by means of a Klett Summerson photoelectric colorimeter. The absorption is measured at 420 m$\mu$ (blue filter) and 660 m$\mu$ (red filter) and the readings converted to percent transmission. Subtraction of the 420 m$\mu$ reading from the 660 m$\mu$ reading gives the percent yellow.

EXAMPLE II (a) Another set of ten glass laminates are similarly prepared by interposing a 0.015 inch thick plasticized polyvinyl butyral resin sheet interlayer (plasticized as in Example I) having a moisture content of about 0.4% and an alkalinity titer of 20 produced by the presence of potassium formate instead of potassium acetate.

Further sets of ten glass laminates were prepared as above except that the amount of potassium formate in the polyvinyl butyral was varied to produce the following alkalinity titers:

(b) 26
(c) 30
(d) 40
(e) 43
(f) 85

After processing, these laminates are tested as in Example I and the results are reported in Table 1.

Table 1

| Example | Moisture Content | Alkalinity Titer | Color (Percent Yellow) | Mean Break Height (Feet) |
|---|---|---|---|---|
| Potassium acetate: | | | | |
| I (a) | 0.40 | 20 | 10.6 | 2.3 |
| (b) | 0.40 | 29 | 13.1 | 2.4 |
| (c) | 0.43 | 42 | | 3.1 |
| (d) | 0.48 | 56 | 18.4 | 5.8 |
| (e) | 0.45 | 87 | 19.2 | 7.0 |
| Potassium formate: | | | | |
| II (a) | 0.40 | 20 | | 2.4 |
| (b) | 0.41 | 26 | | 3.1 |
| (c) | 0.44 | 30 | | 3.8 |
| (d) | 0.34 | 40 | 21.0 | 7.0 |
| (e) | 0.39 | 43 | | 7.5 |
| (f) | 0.36 | 85 | | 8 |

The results in the above table indicate that glass laminates employing interlayers of polyvinyl butyral containing potassium formate to produce the alkalinity titer possess superior penetration resistance as compared to those containing potassium acetate.

Table 2 shows the results of further examples of safety-glass laminates prepared as in Example I except that a resin interlayer sheet is used with a thickness of 0.030 inch.

Table 2

| Example | Potassium Salt | Percent Moisture | Alkalinity Titer | "Mean Break Height" (Feet) |
|---|---|---|---|---|
| III (a) | Acetate | 0.48 | 40 | 13.2 |
| (b) | do | 0.43 | 50 | 15.4 |
| (c) | do | 0.40 | 60 | 17.0 |
| (d) | do | 0.39 | 80 | 18.0 |
| IV (a) | Formate | 0.36 | 30 | 12.8 |
| (b) | do | 0.45 | 40 | 17.0 |
| (c) | do | 0.42 | 50 | 19.3 |
| (d) | do | 0.40 | 82 | 22.0 |

EXAMPLES V–VIII

The procedures of Example I are again followed to produce sets of glass laminates, this time to illustrate other potassium salts which do not have a beneficial effect on the resistance to penetration of the laminates. These sets as in Example I again use 15 gauge interlayers.

| Example | Potassium Salt | Percent Moisture Content | Alkalinity Titer | "Mean Break Height" (Feet) |
|---|---|---|---|---|
| V | K$_2$ Oxalate | 0.34 | 28 | 2.0 |
| VI | K$_2$CO$_3$ | 0.63 | 29 | 2.3 |
| VII | K$_3$PO$_4$ | 0.45 | 26 | 2.1 |
| VIII | KH$_2$PO$_4$ | 0.38 | 40 | 2.1 |

It is well known that an increase in the thickness of the plasticized polyvinyl butyral interlayer will give some improvement to the penetration resistance of the laminates. This invention is equally applicable to the thicker laminates as is shown in Example IV. In fact, the use of an interlayer 0.030 inch thick containing the potassium formate results in "mean break heights" more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 25 m.p.h. In other words, at normal interlayer moisture contents, if the alkalinity level is controlled in accordance with the practice of this invention, a far superior safety laminate will result.

The laminated safety glass of this invention is especially efficient in that the improved resistance to penetration is balanced over a wide temperature range. The impact tests shown in the examples are conducted at room temperature; however, tests conducted at as low as 4° F. and as high as 120° F. indicate that these laminates exhibit improved properties over a wide temperature range.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low. On the other hand, the alkalinity titer of the polyvinyl butyral interlayer can be readily increased by the addition of the potassium formate during the preparation of the polyvinyl butyral resin. The minimum quantity of potassium formate necessary to effect a particular improvement in penetration resistance of the final laminate has been found to be inversely proportional in some degree to the preferred moisture content. The amount of moisture is preferably kept within the range of 0.1 to 0.8% with the interlayers of this invention having an alkalinity titer of over 25. Between moisture limits of 0.3 and 0.5%, this inverse correlation is not critical. At alkalinity titer levels of 25 or lower the moisture content may have to be increased to an undesirable level in most standard laminating operations thereby tending to cause bubbles or blisters in the final laminate.

In order to avoid alkali burns on processing of the resin and to avoid excessive sensitivity to moisture in the interlayers which may result in edge separation of the laminates it is highly preferred to limit the alkalinity titer so that it is not over 90. However, high impact strengths are achieved with this invention at far lower titers. For the above reasons, it is a preferred embodiment of this invention to limit the alkalinity titer to a maximum of 40.

In the preparation of the safety-glass laminates as described in the preceding examples, the glass and polyvinyl butyral interlayers were maintained as clean as is feasibly possible under carefully controlled conditions. The presence of lint, dust, atmospheric oils, etc., on the surface of either the glass or interlayer will affect the "mean break height" results. If the glass or plastic is contaminated by these impurities to any great extent, the effect on "mean break height" results can be substantial. However, the intent of the safety-glass laminators is to produce laminates as contamination-free as possible, thus reducing this problem to a minimum.

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The plastic material employed as the interlayer in the practice of this invention is plasticized polyvinyl butyral. Other polyvinyl acetals such as the acetals of acetaldehyde or propionaldehyde or mixtures thereof may also possibly be used. In general, the interlayer thicknesses which are used to laminate glass for safety-glass use are in excess of 0.010 inch. The laminates conventionally used for windshields of automobiles are generally about 0.015 inch thick. However, laminates have been prepared for various applications where the interlayer thickness varied anywhere from 0.010 inch up to 0.065 inch. A laminate particularly suitable for windshield application, which would not be penetrated by a human head upon collision impacts of a vehicle against stationary objects at speeds in excess of 25 m.p.h., is one where the alkalinity titer of the interlayer is in excess of 25 and the thickness of the interlayer is between 0.025 to 0.035 inch with moisture contents within the normal range, i.e. 0.1 to 0.8% by weight.

The preparation of the polyvinyl acetal resin is well known. In general, the resin is prepared by first hydrolyzing polyvinyl acetate. The hydrolyzed product is then reacted with butyraldehyde in ethanol solution in the presence of a suitable quantity of sulfuric acid. The reactions are controlled to produce a polyvinyl butyral resin containing approximately 9 to 30% of unreacted hydroxyl groups (usually 12 to 25%) calculated as weight percent of vinyl alcohol and about 0 to 3% of ester calculated as weight percent of vinyl acetate; the balance being vinyl butyral. The resulting product may be precipitated from the ethanol by the addition of water followed by repeated water washings until substantially all of the acid is removed. After the acid is substantially removed, the product is stabilized by treatment with potassium or sodium hydroxide while in suspension in an aqueous solution of ethanol containing about 30% ethanol. About 100 parts of resin are used for every 1000 parts of suspension medium. The suspension is maintained at about 40° C. for several hours under moderate agitation while being maintained slightly alkaline to phenolphthalein by the addition of suitable quantities of potassium or sodium hydroxide. The polyvinyl acetal resin is then separated from the suspension medium and washed with water.

The resin at this stage will contain approximately 20–30 ml. alkalinity titer composed of essentially potassium acetate or sodium acetate. In order to replace these salts with the salts of this invention, the resin is swelled in a mixture of alcohol-water (0.960 sp. gr.) at about 40° C. for 1 hour and then washed thoroughly with water until the dried resin is neutral to brom-phenol blue in the alkalinity titer test. Appropriate amounts of the potassium formate are then added to a slurry of the washed zero alkalinity titer resin (5 parts water per part of resin). After thirty minutes the grains are filtered and dried. Uniform distribution of the salts is further effected by the plasticization step.

An alternative method of adding the salts to a zero titer resin is by adding it with the plasticizer during the plasticization step.

The resin produced may be plasticized to the extent of about 20 to 50 parts plasticizer per 100 parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di(beta-butoxyethyl) adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. In an improved plasticized polyvinyl acetal interlayer, having a moisture content of from about 0.1 to 0.8% and a vinyl alcohol content of from about 9 to 30% by weight based on the weight of the polyvinyl acetal the improvement which comprises incorporating sufficient potassium formate into the interlayer to produce an alkalinity titer of from about 25 to 40.

2. The improved plasticized interlayer of claim 1 wherein the plasticized polyvinyl acetal is polyvinyl butyral.

3. In an improved laminated safety glass comprising two layers of glass bonded to a plasticized polyvinyl acetal interlayer, having a moisture content of from about 0.1 to 0.8% and a vinyl alcohol content of from about 9 to 30% by weight based on the weight of the polyvinyl acetal, the improvement which comprises incorporating sufficient potassium formate into the interlayer to produce an alkalinity titer of from about 25 to 40.

4. The improved laminated safety glass of claim 3 wherein the polyvinyl acetal interlayer is polyvinyl butyral.

5. The method of preparing an improved plasticized polyvinyl acetal interlayer which comprises swelling a polyvinyl acetal resin in a mixture of alcohol and water at about 40° C. for about 1 hour and washing with water until the resin has a substantially zero alkalinity titer, then adding to an aqueous slurry of the resin sufficient potassium formate to produce an alkalinity titer of from about 25 to 40, adjusting the moisture content of the polyvinyl acetal to about 0.1 to 0.8% by weight and plasticizing the polyvinyl acetal.

References Cited by the Examiner

UNITED STATES PATENTS

| 2,720,501 | 10/1955 | Van Ness. | |
| 2,946,711 | 7/1960 | Bragaw et al. | 161—199 |

FOREIGN PATENTS

| 136,704 | 3/1950 | Australia. |

ALEXANDER WYMAN, *Primary Examiner.*

W. J. VAN BALEN, *Assistant Examiner.*